United States Patent [19]
Peterson

[11] 3,741,815
[45] June 26, 1973

[54] RAILROAD SIGNAL BATTERY BOX
[75] Inventor: Fred D. Peterson, Belmont, Calif.
[73] Assignee: Peterson Products of San Mateo, Inc., Belmont, Calif.
[22] Filed: Jan. 25, 1972
[21] Appl. No.: 220,570

[52] U.S. Cl. .................... 136/166, 136/172, 206/2, 220/24 R
[51] Int. Cl. ............................................. H01m 1/04
[58] Field of Search ................... 136/166, 171, 172; 206/2; 220/24 R, 46 BA

[56] References Cited
UNITED STATES PATENTS
1,107,084  8/1914  Mason .............................. 136/166
2,364,144  12/1944 Hunsaker .......................... 136/172
2,094,329  9/1937  Mascuch ........................... 136/166
3,067,905  12/1962 Ehret .................................. 206/2

Primary Examiner—Donald L. Walton
Attorney—Stephen S. Townsend, J. Georg Seka et al.

[57] ABSTRACT

A box for storing batteries for railroad signal backup systems in the ground. A receptacle is constructed of a lightweight, thin-walled fiberglass material and is closed with a cover removably placed over an open top of the receptacle. Means are provided to lock the cover to the receptacle, to permit air breathing while the receptacle is closed, and to pass cables buried in the ground through the receptacle bottom into the receptacle interior while preventing ground moisture from entering the receptacle. A wooden terminal strip is provided for the formation of electrical connections and anti-flotation lobes prevent a rising of the partially buried battery box when the ground water level rises above the receptacle bottom.

8 Claims, 3 Drawing Figures

Patented June 26, 1973
3,741,815
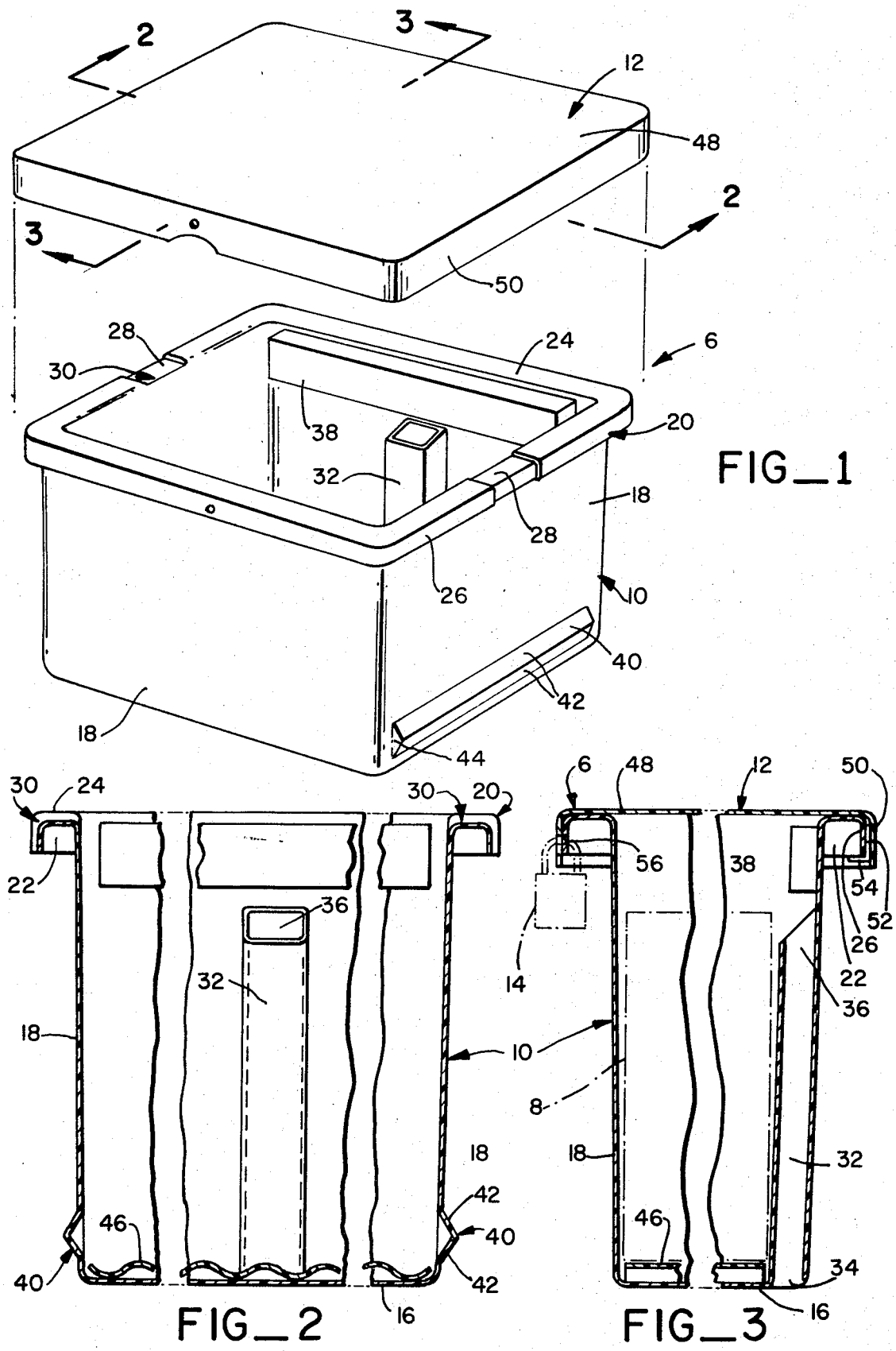
FIG_1
FIG_2
FIG_3

RAILROAD SIGNAL BATTERY BOX

BACKGROUND OF THE INVENTION

Electric railroad signals include one and usually at least two or more backup systems to assure signal operation if the main on-line power supply fails. The required electric current is supplied from batteries placed adjacent each signal.

In the past thick-walled, heavy concrete boxes were provided for storing the batteries and protecting them from the atmosphere. The boxes were partially buried in the ground and included heavy concrete covers that were locked to the boxes with heavy chains to prevent the unauthorized tampering with or the theft of the boxes.

Such boxes are usually too heavy to be handled by one person, are relatively easily breakable by impact due to the brittleness of conrete and are expensive. Moreover, there are difficulties in properly entering cables into the battery box without subjecting the box interior to moisture or ground water which could adversely affect the operability of the battery.

SUMMARY OF THE INVENTION

The present invention provides a lightweight storage box for a railroad signal battery which is readily handled and manipulated by one person and which is relatively inexpensive to construct. The box is constructed of tough, corrosion-resistant plastic such as fiberglass and encloses the battery so that it is shielded from adverse affects of moisture and/or the ground water level while permitting the battery to breathe by providing an air exchange between the closed box interior and the box exterior. Flotation of the box under rising ground water level is prevented by the provision of anti-flotation lobes which effectively anchor the box to the ground.

Generally speaking, a railroad battery box constructed in accordance with the present invention comprises a generally rectangular receptacle having a flat bottom member, upwardly extending walls and an opened top. The walls terminate in a downwardly opening, generally U-shaped rim that extends all around the top, the box being constructed of relatively lightweight fiberglass so that one person can carry it. The rim defines a flat top surface and includes means defining at least one, relatively short depression in the top surface for communicating the receptacle interior with the exterior when the receptacle is closed. Outwardly protruding anti-flotation lobes are defined by at least one pair of opposing walls and are positioned adjacent the bottom member and integrally constructed with the respective wall. A vertically oriented, elongate tubular cable communicates the receptacle interior with the exterior from a point adjacent but spaced below the top to a point at about the bottom member of the receptacle for passing electrical cables generally through the bottom member into the receptacle interior while preventing ground water and the like from rising in the receptacle interior. A wooden terminal bar is secured to the receptacle interior adjacent the upper terminus of the chute and facilitates the formation of electrical connections.

A flat cover is placed on the flat surface of the rim to close and seal the receptacle interior from the exterior except for air communication permitted by the depression in the rim. The cover includes a downwardly depending skirt for positioning closely adjacent a free leg of the rim. At least one side of the cover has a lid-keeper disposed generally parallel to the flat cover portion and spaced therefrom for placement beneath and closely adjacent a lowermost end of the free leg portion of the rim for preventing upward lifting of the cover by engaging the lid-keeper with the leg of the rim. The skirt and the free leg of the rim include apertures at a location generally opposite from the keeper which are in mutual alignment when the cover is placed over the receptacle. The cover is locked to the receptacle with a standard railroad padlock or the like by extending the lock through the aligned apertures.

It is further preferred to provide means for spacing a battery placed in the receptacle above the bottom member of the receptacle. Moisture that collects on the bottom member is thereby prevented from adversely affecting the battery.

The railroad signal battery box of the present invention is a substantial improvement over prior art boxes because of its relatively low cost, ease of handling and because of its lesser susceptibility to damage from impact as from flying objects or the like. It eliminates unsightly chaining of the cover for battery boxes to prevent unauthorized tampering with the batteries, provides for a better protection of the battery from the atmosphere and ground and assures optimal battery operation and life due to the air access to the battery box interior while shielding the access opening against the atmosphere and the ground and thereby preventing appreciable moisture collection inside the box.

BRIEF DESCRIPTION OF THE DRAWINGS

FIG. 1 is a perspective side elevational view of a railroad battery storage box constructed in accordance with the invention and illustrates the cover of the box removed from the receptacle to provide a view of the receptacle interior;

FIG. 2 is a side elevational view, in section, is taken on line 2—2 of FIG. 1 and illustrates the battery box with the cover removed from the receptacle; and FIG. 3 is a side elevational view taken on line 3—3 of FIG. 1 and illustrates the battery box with the cover secured to the receptacle.

DESCRIPTION OF THE PREFERRED EMBODIMENTS

Referring to the drawings, a storage box 6 for a railroad signal backup battery 8 (this is shown in phantom lines in FIG. 3 only) generally comprises a receptacle 10 and a cover 12 for closing and sealing the receptacle. The receptacle has a generally rectangular outline and is sized to correspond to the size of the battery placed therein. The cover is flat and can be locked to the receptacle with a padlock such as a standard railroad padlock 14 (shown in phantom lines in FIG. 3 only) to prevent the unauthorized tampering with the battery in use.

One or more battery storage boxes are placed in the ground adjacent a railroad signal and the batteries are electrically connected with controls, signal lights, etc., so that the railroad signal operates even when the main line power supply should fail. The batteries and the battery boxes remain in place for many years and it is the function of the battery box to protect the batteries from corrosion and adverse effects of the atmosphere as well as against tampering, theft and the like.

The rectangular receptacle for the battery generally comprises a flat bottom member or base 16 and integrally constructed, vertically upwardly extending walls 18 that define an open receptacle top. The upper end of the walls terminate in a continuous rim 20 which has a generally U-shaped section and defines a downwardly opening channel 22. A web of the channel defines an upwardly facing, flat surface 24 against which cover 12 fits. A short, downwardly depending free leg 26 is spaced from the walls.

At least one and preferably two or more intermediate sections 28 of the rim are depressed or cut back to define air passages 30 through which the box interior communicates with the exterior when closed with cover 12.

A vertically oriented, elongate cable chute 32 is positioned interiorally of the battery box and has a generally rectangularly tubular cross-section. A lower end 34 terminates at base 16 of the receptacle and an upper end 36 of the chute terminates slightly below receptacle rim 20. A wooden terminal strip 38 is secured to an inside of the wall 18 along which chute 32 runs and is positioned between upper chute end 36 and the rim. In use cables buried in the ground and leading to the railroad signals are brought into the battery storage box through chute 32. Electric connections with cables connected to the battery or batteries in the box are made on the terminal strip.

At least two opposing side walls 18 of receptacle 10 define anti-flotation lobes 40 at the lower end of the receptacle just above base 16. The lobes are defined by at least two triangularly arranged flat surfaces 42 which angle outwardly from the adjacent side wall 18. Ends of the lobes are closed off by end surfaces 44 to prevent water or soil from entering the battery storage box when the receptacle is at least partially buried in the ground.

A corrugated bottom liner 46 is placed over base 16 and spaces battery 8 above the base so that any moisture from condensation or the like collecting inside the battery box does not contact the battery and the battery is maintained dry.

The receptacle is constructed of a lightweight, tough and relatively rigid plastic material inert to the ground and the atmosphere. It is presently preferred to construct the receptacle of conventional fiberglass, that is fiber-reinforced wet lay-up resin. Fiberglass renders the receptacle rigid and corrosion-resistant as well as tough, prevents breakage from impact and assures long trouble-free service life.

Cover 12 is preferably also constructed of fiberglass and is defined by a flat center section 48. A continuous skirt 50 defined by short wall sections depends from the center portion. The skirt is dimensioned so that it fits snugly over the downwardly depending free legs 26 of receptacle rim 20 to form a good, weather-tight seal between the mating flat rim surface 24 and flat center section 48 of the cover. At least one and preferably two or more angle pieces 52 are secured, e.g. bonded to, the inside of one skirt length to define a lid keeper. Free legs 54 of the angles are spaced from flat center portion 48 a distance equal to or slightly greater than the distance between the flat rim surface 24 and the end of free leg 26 so that the angle can be slipped over the rim and engaged with the rim.

When the cover is placed over receptacle and angle pieces 52 engage rim 20 apertures in an opposing rim portion and skirt length are aligned to define a locking bore 56 through which padlock 14 is extended. By locking the padlock the cover is locked to the receptacle and cannot be removed therefrom by virtue of the interengagement between the rim and the angle pieces so that unauthorized tampering with the battery, theft, etc., is prevented.

In use the receptacle is sized to accommodate the particular battery. Usually it will have a height of approximately 1½ ft. and it is buried in the ground up to a depth of about 6 to 8 inches from base 16. Cables leading to the railroad signal are passed through chute 32 and suitably connected with the battery directly or via terminal strip 38. The cover is then placed over the receptacle and locked. An air exchange between the box exterior and its interior is possible via air passages 30 defined by rim depressions 28. Contamination of the box interior from foreign particles entering through the air passages is prevented since skirt 50 extends over the depressed rim sections and prevents foreign particles from entering.

Ground water is prevented from entering the interior of the battery box by virtue of the raised upper end 36 of cable chute 32. Should the ground water level rise to above floor member 16 it rises equally within the cable chute. However, since the cable chute extends substantially above ground level the ground water cannot enter the portion of the battery box occupied by the battery and, therefore, cannot cause damage.

During routine maintenance and/or cleaning of the battery box after a severe flood, for example, the cover can simply be opened and the battery lifted from the receptacle by disconnecting the conductors from terminal strip 38. Cleaning of the receptacle box bottom is greatly facilitated and speeded up by the readily removable corrugated liner or insert which can be removed, washed outside the receptacle and then replaced.

I claim:

1. A box for the out-door storage of batteries of electrical railroad signal backup systems comprising: a battery receptacle of sufficient size to receive at least one battery, the receptacle having a base, upright walls, an open top and being constructed of a relatively lightweight, thin-walled plastic material, the receptacle including a vertically oriented, elongate tubular cable entrance chute, the chute having a lower end which communicates with the exterior disposed at the base an an upper end which communicates with the interior terminating adjacent the top of the receptacle, a cover for placement across the top of the receptacle, and means in addition to the chute and disposed adjacent the top for communicating the receptacle interior with the exterior to permit breathing of the battery when the cover is in place.

2. A box according to claim 1 wherein the chute terminates slightly below the top end of the receptacle, and including a terminal strip secured to the receptacle between the upper end of the chute and the top to facilitate the formation of electric connections.

3. A box according to claim 1 including a corrugated liner placed on the base for spacing the battery above the receptacle base and prevent contact between water collecting on the receptacle bottom and a battery placed in the receptacle.

4. A box according to claim 1 including anti-flotation lobes protruding outwardly from the walls at opposite points of the receptacle for burying the lobes underground and prevent the box from flotation when ground water rises above the base.

5. A box according to claim 1 wherein the cover is separate of the receptacle, wherein the top of the receptacle is defined by a doubled over rim defining a continuous downwardly facing channel, wherein the cover is substantially flat and includes a downwardly depending skirt for placement over the rim, and including means for interengaging a portion of the rim and an adjacent portion of the skirt, and mutually aligned apertures in another portion of the rim and of the skirt opposite from the first mentioned portion of the rim and the skirt for locking the cover to the receptacle with a conventional padlock.

6. A lightweight railroad battery box for storing a battery used for railroad signal backup systems and for protecting such battery from the atmosphere, the box comprising a generally rectangular receptacle having a flat bottom member, upwardly extending walls and an opened top, the walls terminating in a downwardly opening, generally U-shaped rim extending all around the top, the receptacle being constructed of relatively lightweight fiberglass so that one person can carry it, the rim defining a flat top surface and including means defining at least one, relatively short depression in the top surface for communicating the receptacle interior with the exterior when the receptacle is closed, at least one pair of opposing walls each defining an outwardly protruding anti-flotation lobe disposed adjacent the bottom member and integrally constructed with the respective wall, a vertically oriented, elongate tubular cable chute communicating the receptacle interior with the exterior from a point adjacent but spaced below the top to a point at about the bottom member of the receptacle for passing electrical cables generally through the bottom member into the receptacle interior while preventing ground water and the like from rising in the receptacle interior, a wooden terminal bar secured to the receptacle interior adjacent the upper terminus of the chute for the formation of electrical connections, a flat cover for placement on the flat surface of the rim and sealing the receptacle interior from the exterior except for air communication permitted by the depression, the cover including a downwardly depending skirt positioned to be disposed closely adjacent a free leg of the rim, at least one side of the cover including a lid-keeper disposed generally parallel to the flat cover portion and spaced therefrom for placement beneath and closely adjacent a lowermost end of the free leg portion of the rim for preventing upward lifting of the cover by engaging the lid-keeper with the leg of the rim, at least one aperture in the skirt and in the free leg of the rim at a side thereof generally opposite from the keeper, the apertures being in mutual alignment when the cover is placed over the receptacle so that the cover can be locked to the receptacle with a standard railroad padlock or the like, and means for spacing a battery placed in the receptacle above the bottom member and any moisture that collects on the member.

7. A box according to claim 6 wherein the chute is integrally constructed with the receptacle.

8. A box according to claim 6 wherein the anti-flotation lobe is defined by contiguous, flat wall sections protruding outwardly from the respective receptacle walls.

* * * * *